Figure 1:
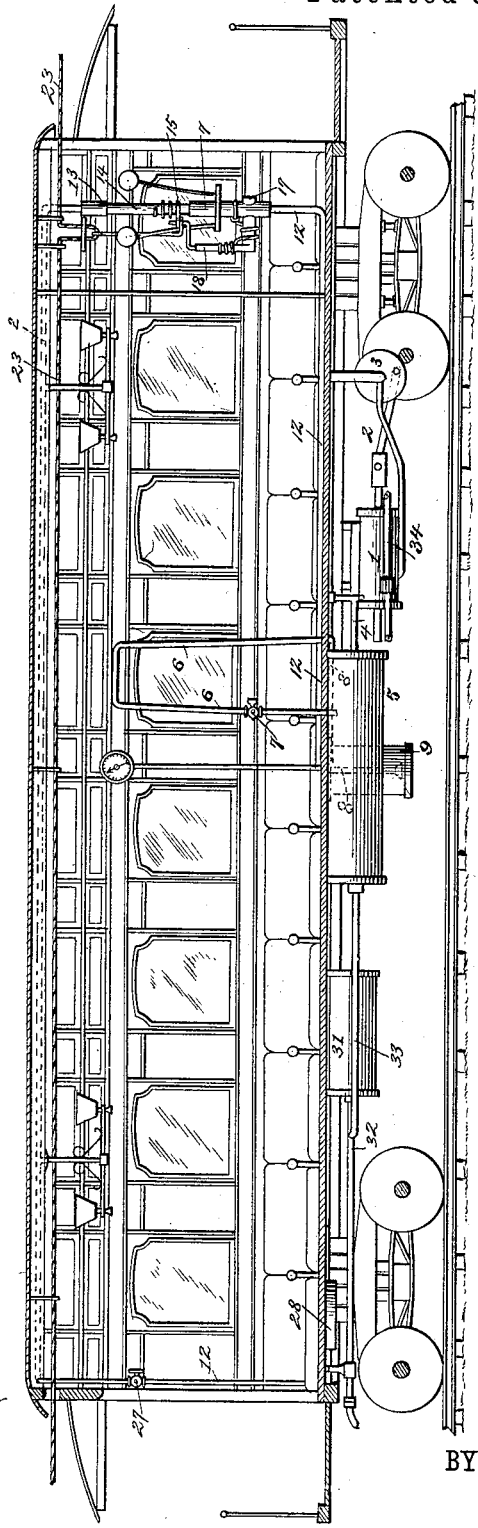

(No Model.) 2 Sheets—Sheet 1.

G. SMITH.
SYSTEM AND APPARATUS FOR HEATING AND LIGHTING CARS.

No. 385,882. Patented July 10, 1888.

WITNESSES:
W. R. Davis
C. Sedgwick

INVENTOR:
G. Smith
BY Munn & Co.
ATTORNEYS.

(No Model.) 2 Sheets—Sheet 2.
G. SMITH.
SYSTEM AND APPARATUS FOR HEATING AND LIGHTING CARS.
No. 385,882. Patented July 10, 1888.
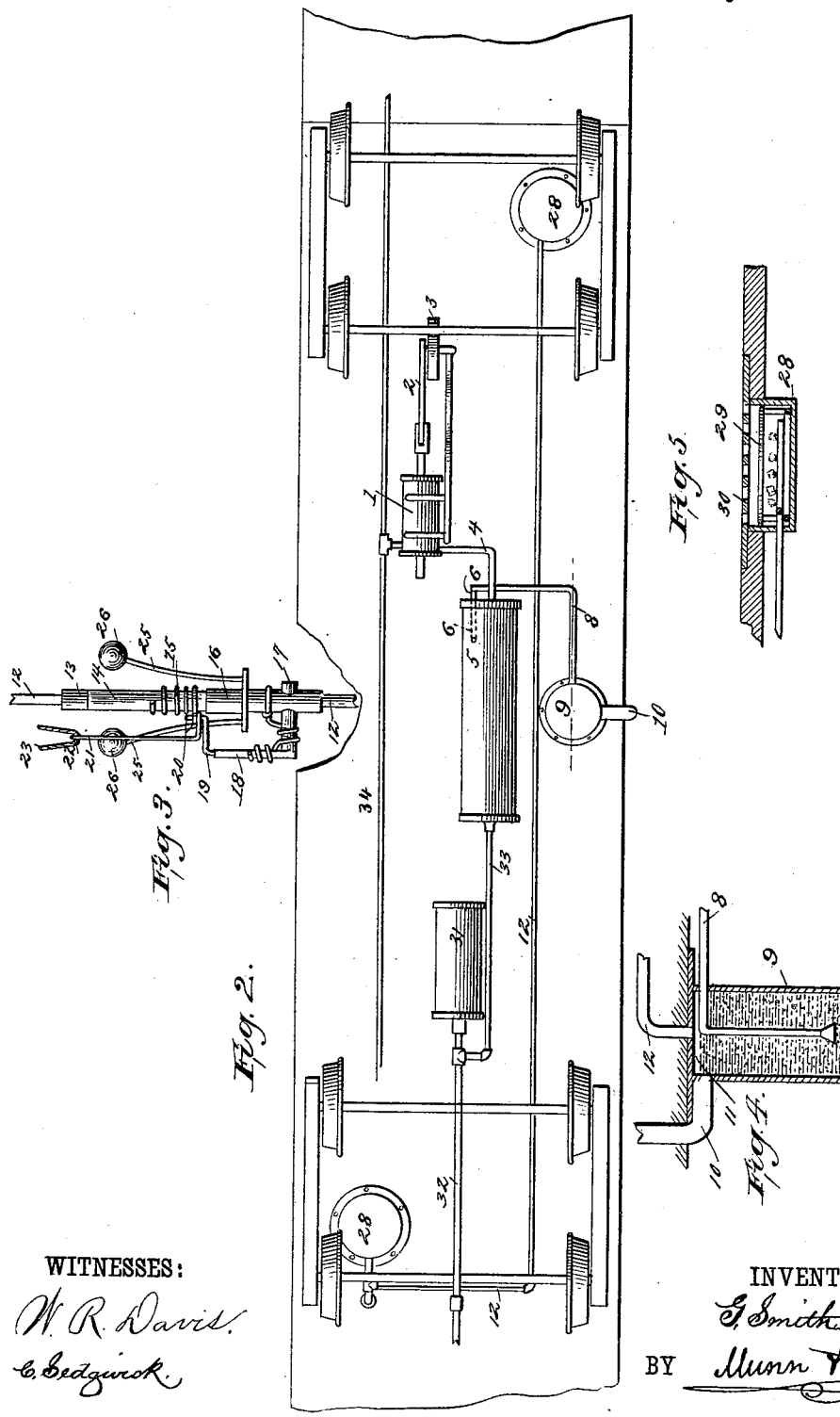
WITNESSES:
W. R. Davis.
C. Sedgwick.
INVENTOR:
G. Smith
BY Munn & Co.
ATTORNEYS.

UNITED STATES PATENT OFFICE.

GEORGE SMITH, OF ROCHESTER, NEW YORK, ASSIGNOR OF ONE-HALF TO MAX BRICKNER AND ABRAHAM STETTHEIMER, BOTH OF SAME PLACE.

SYSTEM AND APPARATUS FOR HEATING AND LIGHTING CARS.

SPECIFICATION forming part of Letters Patent No. 385,882, dated July 10, 1888.

Application filed July 7, 1887. Serial No. 243,625. (No model.)

*To all whom it may concern:*

Be it known that I, GEORGE SMITH, of Rochester, in the county of Monroe and State of New York, have invented a new and Improved System and Apparatus for Heating and Lighting Cars, of which the following is a full, clear, and exact description.

My invention relates to an improved system and apparatus for heating and lighting cars, and has for its object to provide a means whereby the several cars of a train may be heated and lighted by the same agent, and wherein in the event of an accident—such as a collision or the derailment or overturning of a car—the supply of combustible material to the heater and lamps will be automatically shut off.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a longitudinal central section through a car having my improvement applied, and Fig. 2 is an inverted plan view thereof. Fig. 3 is a detail view of the automatic cut-off, and Fig. 4 a central vertical section through the naphtha-tank. Fig. 5 is a central vertical section through the heater.

In carrying out the invention an air-pump, 1, is suspended beneath the car in the vicinity of the truck, the piston of the said pump being united by a connecting-rod, 2, with a disk, 3, which disk has a bearing upon the axle, as shown in Fig. 1. The air from the pump 1 is discharged through the pipe 4 into a reservoir, 5, also attached beneath the car, and from said reservoir the air is passed up through a U-shaped pipe, 6, projecting upward within the car, as shown in Fig. 1, at one side, which U-shaped branch is provided with a stop-cock, 7, in the member having direct communication with the reservoir. The opposite member of the said U branch 6, passing through the floor of the car, is, as shown in dotted lines, Fig. 1, connected with a horizontal pipe, 8, which pipe is projected through and made to extend downward into a tank, 9, attached about centrally the bottom of the car at one side.

The tank 9 is adapted to be filled with naphtha nearly to the top, the same being entered from the side of the car through a pipe, 10, (shown in Figs. 2 and 4,) the pipe 8 within the tank being made to extend down nearly to the bottom thereof. The space between the top line of the naphtha and the top of the tank constitutes an air-chamber, 11.

From the top of the tank 9 a pipe, 12, is led upward through the bottom of the car and made to run along the floor and upward, preferably through the dressing-room or in that location, and also through the roof. Between the floor and roof, however, the pipe 12 is divided, the upper end being fitted with a sleeve, 13, into which one end of a glass tube, 14, is inserted, having coiled around the same a stout wire, 15. The other or lower end of the glass tube 14 is held within an enlarged section of tubing, 16, provided with the stop-cock 17, the said tubing being connected with the lower section of pipe 12 in any approved manner, as shown in detail, Fig. 3, and also in Fig. 1.

The stop-cock 17 is spring-actuated, its normal position prior to setting it being closed, and the stem thereof is provided with a right-angular arm, 18, having fitted therein a crank-arm, 19, projecting inward in direction of and near to the line of intermediate piping aforesaid. The lower end of the coil of wire 15 is bent upon itself to form an eye, 20, adapted to receive the crank 19, as shown in Fig. 3, and hold the stop-cock open against the tension of the spring controlling the same. The coil of wire 15, after forming the eye 20, is carried at right angles upward to form the vertical arm 21 and bent upon itself again to form another eye, 22.

A rope, 23, of wire or other strong material, is passed through the eye 22 and through the car from end to end, as shown in Fig. 1, being supported its length by friction-pulleys in similar manner to a bell-cord, and coupled with the ropes of the other cars also in like manner, whereby the coil 15 may be raised upon the glass tube by the engineer, conductor, or any person upon the train, and the stem of the stop-cock 17 be released and the said cock automatically closed, thus shutting off the supply of gas from the naphtha tank.

To provide a means of automatically closing the stop-cock by means of an unusual or violent lurch of the car, two spring-arms, 25, are attached to the tubing 16 and held in a vertical position upon each side thereof. The said arms, terminating at a point opposite the glass tubing 15, are each provided at their extremities with metal balls 26, of such weight as that should the lurch come from either end of the car the one or both of the balls striking the said glass tube will break the same, and, releasing the wire coil, also release the valve-stem. Thus the air passing through the naphtha and rendered thereby highly inflammable will be prevented from escaping and by any possibility taking fire. The naphtha-tank, being beneath the car and centrally located, is also out of danger.

The pipe 12 is continued along the roof outside, and connection is made with each illuminating-burner, the charged air being thus used to light the car instead of the ordinary gas or oil as at present used. The supply-pipe 12 extends down into the car at its end opposite the glass tube, where a valve, 27, is provided, thence through the bottom of the car and along the under side thereof to a point at or near the opposite end, as shown in Fig. 2, to connect the two heaters 28. One heater 28, which may be of any well-known construction for burning naphtha and provided with one or more burners, is attached beneath the car at each end in any approved manner, as shown in Fig. 5. The bottom of the heater is perforated to admit air, and above the flame a metal plate, 29, is supported, which plate, becoming heated, will add to the amount of heat produced by the burners, the entire radiation being adapted to pass up into the car through registers 30, set in the floor over the heaters.

In the event a train carrying my improvement is snow-bound or compelled to stand still for a length of time after the air in the reservoir 5 is exhausted, the pump 1 will cease to supply, and the heat and light be thereby cut off if other means were not provided to continue the supply of air. To this end a smaller and auxiliary reservoir, 31, is suspended beneath the car, as shown in Fig. 2, and a pipe-communication, 32, is established between the said auxiliary reservoir and the pump adapted to supply air to the brakes, and between said pipe 32 or the reservoir 31 and the main reservoir 5 a tubular communication, 33, is made, as also shown in Fig. 2. Thus a constant supply of air is obtained at all times.

It is my intention to locate the air-pump beneath the baggage-car or other car near the engine only, and by a line of piping, 34, properly coupled, supply air from the one pump to the reservoir of the various cars, a like connection being made from the engine to the various auxiliary reservoirs.

From the foregoing description, read in connection with the drawings, the operation will be understood, and it will also be evident that by my improvements a train of cars may be thoroughly heated and lighted without the least danger from fire in the event of an accident, as the supply of gas is automatically cut off at such time, and the fire in the heaters thereby almost instantly extinguished.

A gage is provided in each car connected with the main reservoir to indicate the pressure of air therein.

Having thus described my invention, what I claim as new, and desire to secure by Letters Patent, is—

1. A car heating and lighting apparatus comprising a compressed-air reservoir, a naphtha-tank connected therewith, a pipe leading from the said tank to the heater and lamp for supplying them with the carbureted air, and an automatic cut-off between the said naphtha-tank and the heater and lamp, substantially as set forth.

2. In a device for heating and lighting cars, a safety attachment comprising a tube having a spring-actuated stop-cock, a glass pipe fitting in said tube, a spring surrounding said glass adapted to engage the stem of the said stop cock and hold the same in an open position, and spring-arms carrying weighted balls attached to said metal tubes, adapted to strike the glass pipe and break the same, substantially in the manner and for the purposes herein set forth.

3. In a device for heating and lighting cars, a safety attachment consisting of a metal tube carrying a spring-actuated stop-cock, a glass pipe fitted in said tube, a wire coil surrounding said pipe, provided with an eye adapted to engage the stem of the valve and hold the same in an open position, and an arm adapted to engage a cord passing through the car, substantially as shown and described, whereby, when said cord is pulled, the stop-cock will close, substantially as set forth.

4. In a car-heater, a safety device for automatically shutting off the gas, consisting of a metal tube, 16, provided with a spring-actuated stop-cock, 17, having a crank-arm, 19, spring-arms 25, attached to said tube, carrying weighty balls 26, a glass tube, 14, held in said metal tube, and a wire coil, 15, on said tube provided with an eye, 20, engaging the crank-arm 19 to hold the cock closed, and an integral vertical operating-arm, 21, substantially as shown and described, whereby, when the balls come in contact with the glass, the said crank-arm will be released, and also when the vertical arm 21 is drawn upward, as herein set forth.

5. The combination, with the burners and pipe supplying them with fuel, of an interposed section of glass forming a continuation of said tube and spring-arms provided at their free ends with weights or balls to break the glass section, substantially as set forth.

6. The combination, with the burners and pipe supplying them with fuel, and provided with a glass section between the source of supply and burners, of an automatically-closing valve, connections between the same and the tube for holding the valve open, and spring-arms provided with balls at their free ends to break the glass and release the valve, substantially as set forth.

7. The combination, with a car provided with air-brake, compressed-air supply, heaters, and burners, of a pipe connecting said heaters and burners, a carburetor from which said pipe receives its air, a compressed-air reservoir connected with said carburetor, and an auxiliary reservoir connected with the first-named reservoir and with the pipe of the compressed-air-brake pipe, substantially as set forth.

GEORGE SMITH.

Witnesses:
J. F. ACKER, Jr.,
C. SEDGWICK.